US011336643B2

(12) United States Patent
Connell, II et al.

(10) Patent No.: US 11,336,643 B2
(45) Date of Patent: *May 17, 2022

(54) ANONYMIZING BIOMETRIC DATA FOR USE IN A SECURITY SYSTEM

(71) Applicant: International Business Machines Corporation, Armonk, NY (US)

(72) Inventors: Jonathan H Connell, II, Cortlandt Manor, NY (US); Fred A Maymir-Ducharme, Potomac, MD (US); Nalini K Ratha, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 16/717,324

(22) Filed: Dec. 17, 2019

(65) Prior Publication Data

US 2020/0128007 A1    Apr. 23, 2020

Related U.S. Application Data

(63) Continuation of application No. 16/266,389, filed on Feb. 4, 2019, now Pat. No. 10,554,659, which is a
(Continued)

(51) Int. Cl.
*H04L 9/40*    (2022.01)
*H04L 29/06*    (2006.01)

(52) U.S. Cl.
CPC ...... *H04L 63/0861* (2013.01); *H04L 63/0421* (2013.01)

(58) Field of Classification Search
CPC ........... H04L 63/0861; H04L 63/0421
(Continued)

(56) References Cited

U.S. PATENT DOCUMENTS 6,041,133 A   3/2000  Califano et al.
6,119,124 A   9/2000  Broder et al.
(Continued)

FOREIGN PATENT DOCUMENTS

WO   2014011608 A2   1/2014

OTHER PUBLICATIONS

Howard, John J. "Biometric Pattern Recognition Models for Identifying Subject Specific Match Probability Across Datasets with Controlled Variability." ProQuest Dissertations Publishing, 2014. (Year: 2014).*
(Continued)

*Primary Examiner* — Thanhnga B Truong
*Assistant Examiner* — Angela R Holmes
(74) *Attorney, Agent, or Firm* — Jeffrey S LaBaw; Anthony Curro

(57) ABSTRACT

An anonymized biometric representation of a target individual is used in a computer based security system. A detailed input biometric signal associated with a target individual is obtained. A weakened biometric representation of the detailed biometric signal is constructed such that the weakened biometric representation is designed to identify a plurality of individuals including the target individual. The target individual is enrolled in a data store associated with the computer based security system wherein the weakened biometric representation is included in a record for the target individual. In another aspect of the invention, a detailed input biometric signal from a screening candidate individual is obtained. The detailed biometric signal of the screening candidate is matched against the weakened biometric representation included in the record for the target individual.

19 Claims, 10 Drawing Sheets

Related U.S. Application Data continuation of application No. 15/970,811, filed on May 3, 2018, now Pat. No. 10,243,952, which is a continuation of application No. 15/789,952, filed on Oct. 20, 2017, now Pat. No. 10,027,663, which is a continuation of application No. 15/131,026, filed on Apr. 17, 2016, now Pat. No. 9,894,063.

(58) Field of Classification Search
USPC .......................................................... 726/7
See application file for complete search history.

(56) References Cited

U.S. PATENT DOCUMENTS

| | | | |
|---|---|---|---|
| 6,950,536 | B2 | 9/2005 | Houvener |
| 7,962,467 | B2 | 6/2011 | Howard et al. |
| 8,041,956 | B1 | 10/2011 | White |
| 8,286,256 | B2 | 10/2012 | Siegel |
| 8,908,929 | B2 | 12/2014 | Bolle |
| 9,391,988 | B2 | 7/2016 | Cronin |
| 9,747,494 | B2 | 8/2017 | Lo |
| 10,204,704 | B1* | 2/2019 | Wurst .................... G16H 10/20 |
| 10,305,895 | B2 | 5/2019 | Barry |
| 2004/0019570 | A1 | 1/2004 | Bolle |
| 2005/0074147 | A1* | 4/2005 | Smith ....................... G07C 9/37 700/83 |
| 2006/0056662 | A1 | 3/2006 | Thieme et al. |
| 2007/0117557 | A1 | 5/2007 | Adjali et al. |
| 2012/0082349 | A1* | 4/2012 | Kong .................. G06V 40/197 382/128 |
| 2013/0004033 | A1* | 1/2013 | Trugenberger ......... G06F 21/32 382/125 |
| 2013/0103951 | A1 | 4/2013 | Klevan |
| 2014/0075528 | A1* | 3/2014 | Matsuoka ............. H04L 63/102 726/7 |
| 2014/0183269 | A1 | 7/2014 | Glaser |
| 2014/0359722 | A1 | 12/2014 | Schultz |
| 2015/0033305 | A1 | 1/2015 | Shear |
| 2015/0074615 | A1 | 3/2015 | Han |
| 2015/0288688 | A1 | 10/2015 | Derakshani |
| 2016/0103833 | A1* | 4/2016 | Sanders .............. G06F 16/9535 707/723 |
| 2016/0226867 | A1 | 8/2016 | Harding |
| 2016/0226985 | A1* | 8/2016 | Yoon ....................... H04L 67/22 |

OTHER PUBLICATIONS

Carillo, "Continuous biometric authentication for authorized aircraft personnel: A proposed design." Naval Postgraduate School Monterey CA Dept of Computer Science, 2003.

Chang et al., "Face recognition using 2D and 3D facial data." ACM Workshop on Multimodal User Authentication. 2003.

Graizi et al. "Domino: Extracting, comparing, and manipulating subsets across multiple tabular datasets." Visualization and Computer Graphics, IEEE Transactions on 20.12 (2014): 2023-2032.

De-La-Torre et al. "An adaptive ensemble-based system for face recognition in person re-identification." Machine Vision and Applications 26.6 (2015): 741-773.

Bolle et al., "The relation between the ROC Curve and the CMC", Fourth IEEE Workshop on Auromatic Identification Advanced Technologies, Oct. 17-18, 2005.

IBM Patents or Patent Applications Treated as Related.

* cited by examiner

| NAME | PASSPORT ID# | ADDRESS | BIOMETRIC TYPE | BIOMETRIC PROFILE DATA |
|---|---|---|---|---|
| ANN B. CHOI | 1112223333444 | 123 A ST. VENICE, CA 90210 | FINGERPRINT IRIS | ARRAY OF DATA (K, L, M INDICES) |
| DAN F. GROVER | 5556667777888 | 456 D ST. BETHESDA, MD 20817 | FACIAL RECOGNITION | ARRAY OF DATA PASSWORD |
| ... | ... | ... | | |
| XAVIER Y. ZEN | 7778889999000 | 890 Z ST. LISLE, IL 60532 | FINGERPRINT FACIAL RECOG | ARRAY OF DATA |

*FIG. 10*

ANONYMIZING BIOMETRIC DATA FOR USE IN A SECURITY SYSTEM

BACKGROUND OF THE INVENTION

Technical Field

This disclosure relates generally to using biometric data in a computer-based security environment. More particularly, it relates to anonymizing biometric data for use in a computer-based environment for security processing of individuals.

Background of the Related Art

The use of biometric data to identify individuals is well known. Biometric technologies such as fingerprint, facial recognition, iris recognition, voice verification, hand geometry, signature verification, keystroke dynamics, and retina scan are employed to identify or verify the identity of users attempting to access computers, computer networks and associated resources, gain access to secure facilities and confirm identifies to government officials. Biometrics can be used in conjunction with other authentication methods such as passwords, PINs, tokens, cards, badges and challenge-response protocols based on personal information.

Biometric technology is based on the distinctive features resident in fingerprints, faces, irises, retinas, voices, signatures, hands, and other physical characteristics of individual. These features, such as the ridge configurations of a fingerprint, the shape of facial elements, the striations and furrows of an iris, and the pitch and cadence of a voice, can be linked to particular individuals with a great degree of confidence.

While biometric data has great value in identifying individuals, unlike a password, PIN or challenge-response protocol, biometric data cannot be easily changed. This poses a problem for individuals whose biometric data is stolen. Identity theft and related fraud using stolen identification data has become a major problem in the United States and throughout the world. Identity theft occurs when one individual fraudulently uses the identity of another to perform activities such as opening credit cards, obtaining identification documents (e.g., drivers licenses), obtaining entitlement/benefits cards (e.g., welfare cards.), and performing other activities which require the use of personal information. The problem of identity theft is much worse when those elements used to authenticate the individual cannot be changed. At least in part due to this problem, as well as other privacy issues, many countries have passed laws regulating the handling of citizens' personally identifiable information (PII), including biometric data.

BRIEF SUMMARY

According to this disclosure, a method, apparatus and computer program product for using an anonymized biometric representation of a target individual in a computer based security system. A detailed input biometric signal associated with a target individual is obtained. A weakened biometric representation of the detailed biometric signal is constructed such that the weakened biometric representation is designed to identify a plurality of individuals including the target individual. The target individual is enrolled in a data store associated with the computer based security system wherein the weakened biometric representation is included in a record for the target individual.

In another aspect of the invention, a detailed input biometric signal from a screening candidate individual is obtained. The detailed biometric signal of the screening candidate is matched against the weakened biometric representation included in the record for the target individual.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 10 is a table of biometric data used in an embodiment of the present invention.

DETAILED DESCRIPTION OF AN ILLUSTRATIVE EMBODIMENT

Figure 1:
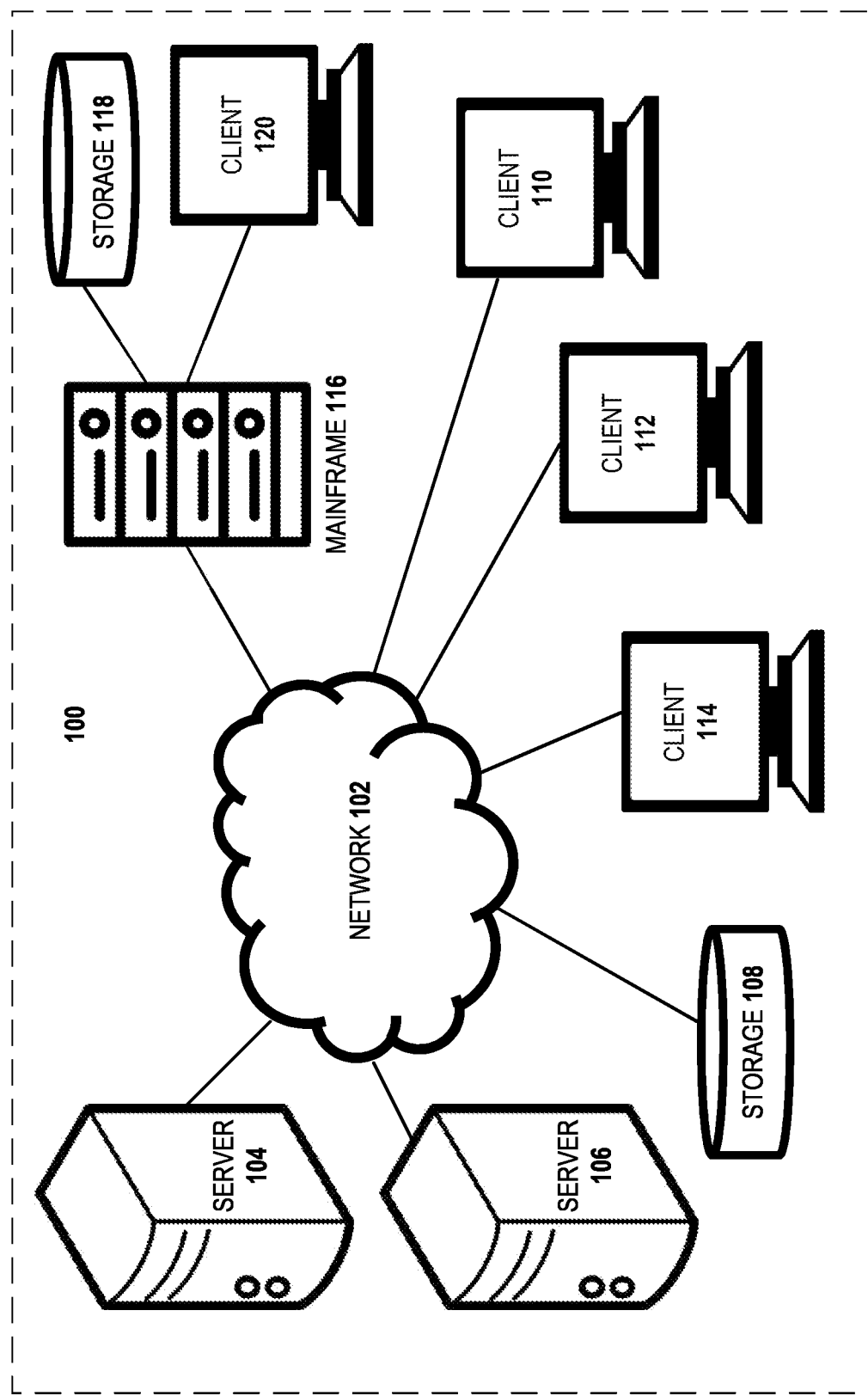
FIG. 1 depicts an exemplary block diagram of a distributed data processing environment in which exemplary aspects of the illustrative embodiments may be implemented.

At a high level, in preferred embodiments of the invention, the present invention obtains a detailed input biometric signal associated from each of a set of target individuals. The system constructs a weakened biometric representation of the detailed biometric signals for each target individual such that for given weakened biometric representation there are expected to be a plurality of matches in a data set, e.g., stored in a database, which contains a sufficient number of other weakened biometric representations. The system creates records for the target individuals in the data store including the weakened biometric representation. When an individual is presented to the system for authentication or screening, a detailed input biometric signal is obtained from a screening candidate individual. The system uses the detailed biometric signal from the screening candidate to compute a weakened biometric representation which is then matched against the records of the target individuals in the database.

Embodiments of the invention solve problems in the 1:M (one to many) matching of biometrics; other embodiments of this invention apply to aspects of biometric authentication (1:1) and identity matching (1:M) systems. A biometric profile as taught by the invention could be used for either, an authentication system (which may be part of a multi-factor or multi-modal authentication system (e.g., a biometric and a password), or a biometric identity matching system which may be extending a watchlist to include both biographic and biometric data. The accompanying diagrams and discussion below explain various aspects of these systems.

The target individuals could be suspects in criminal activity, members of an organization or citizens entitled to government benefits. The database, for example, could be a "watchlist" database for suspected criminals for use by customs, border security or police personnel to identify such individuals. When the weakened biometric data of a screening candidate matches the record of a target individual in the context of a watchlist database, further analysis, e.g., questioning, can ascertain whether the screening candidate is the same individual as the matching target individual. For other applications, in combination with other authentication data, it is enough that the screening candidate weakened biometric data of one or more individuals in the database. The system is efficient in that few screened individuals will be a false positive match with a target individual, while the target individuals' privacy is maintained as the weakened biometric data is insufficient to uniquely identify an individual.

The general idea of using profiles (e.g., hair/eye color, race, facial features, etc.) in law enforcement, air/land/sea border protection, etc. has existed for many years. When using a profile, if an individual possesses sufficient attributes that are contained in one or more of the profiles, he is identified for further assessment, identification and processing. Similarly, when one attempts to authenticate an individual that one has never met, one uses the profile data provided by others to initially match the individual's characteristics to the characteristics described in the profile provided.

This invention extends the idea of profiles to include the use of more accurate, biometric technology. An advantage of this invention is that using a biometric profile, many risks and societal challenges associated with using a full biometric which uniquely identifies an individual are avoided. Biometric data, even when in the weakened profile used in the invention, can provide much stronger authentication (e.g., on a credit card or mobile device) than traditional security passwords, tokens, etc. The weakened biometric profile provides stronger identification for sensitive applications (e.g., a border crossing watchlist) than traditional personal data (e.g., name, address, country of origin, etc.), while avoiding many risks, e.g., theft of detailed biometric data, and constraints, e.g., laws prohibiting transfer of PII across borders, associated with using traditional biometrics for authentication or identification.

There are many attributes, subsets, or transformations that can be computed from a biometric. For the purposes of the invention, a "biometric profile" or "weakened biometric representation" is defined as a partial set of biometric-based data, which contains sufficient data to match an individual to the biometric profile—and the same biometric-based data set will statistically match other individuals to the same biometric profile. The biometric attributes, subsets or transformations can be calibrated to increase or decrease the "fidelity" of the matching—depending on the desired or required quality of the biometric profile. One way to measure the fidelity or strength of the matching is by the percentage of possible False-Positive and False-Negative matches. Embodiments of the invention include the ability to select which biometric modes are used by the system to profile the individual, as well as the ability to calibrate, e.g., increase or decrease, the fidelity of the biometric profile thereby affecting the subset of the population that would match the profile.

Biometrics is an important technology area within the government today. The Homeland Security Presidential Directive 12 (HSPD-12) calls for every agency to start using biometrics as an element of the Personal Identification Validation (PIV) initiative. Internationally, the European Union (EU) has an ongoing initiative to incorporate biometrics into national ID cards for travel across European Nations. Privacy is a key social and political issue that has surfaced as biometrics emerge as a primary identification technique, presenting new challenges and risks to modern mobile and cloud platforms. From the systems complexity and cost perspective, the processing and storage requirements associated with biometrics are also a major concern with these systems—particularly for de-centralized systems that must be fielded across numerous locations and operate within very conservative space, computer storage and computing power (e.g., a small, single server supporting a dozen desktops, or a stand-along PC). This invention provides major increases in the effectiveness, efficiency and privacy of applying biometrics technology.

Figure 2:
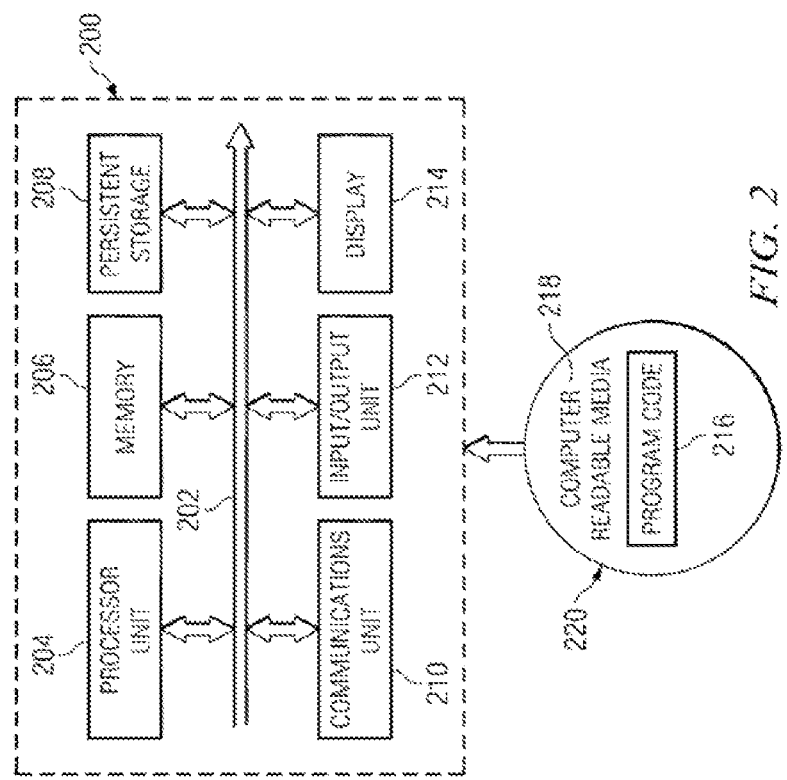
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, mobile devices, smartphones or the like. In the depicted example, server 104 provides data, such as boot files, operating system images, and applications to the clients 110, 112, and 114. Clients 110, 112, and 114 are clients to server 104 in the depicted example. Mainframe computer 116 is shown connected to network 102. Mainframe computer 116 can be, for example, an IBM System z mainframe running the IBM z/OS operating system. Connected to the mainframe 116 are mainframe storage unit 118 and client 120. Client 120 is either a PC connected directly to the mainframe communicating over a bus, or a console terminal connected directly to the mainframe via a display port. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Further, embodiments of the invention can be implemented on stand-alone systems which are not connected to a network for reasons of security, capability of the device or location, e.g., remote from a network.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls). The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
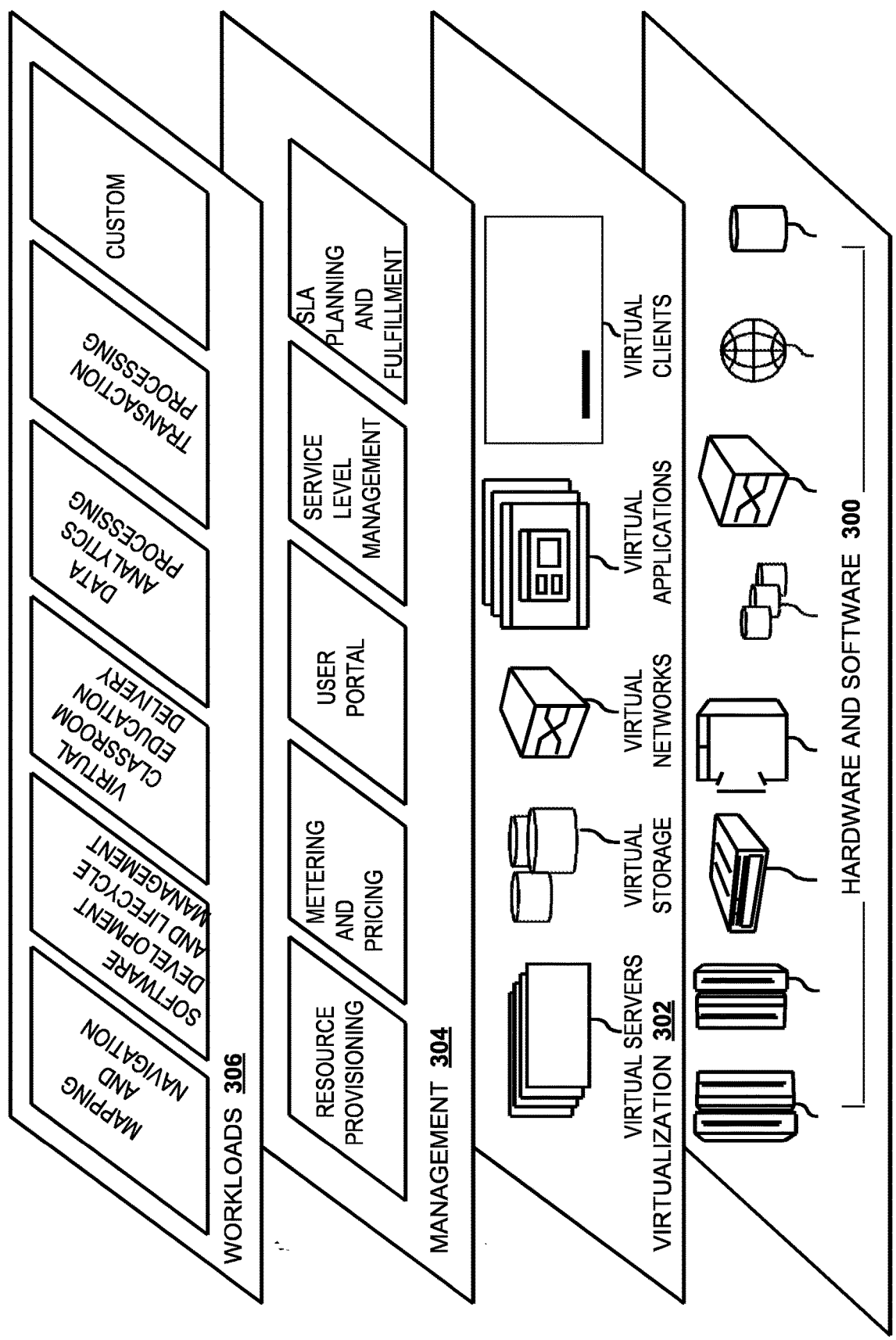
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and others (e.g., enterprise-specific functions in a private cloud).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Both government and industry recognize the value of biometrics in their security systems, which provide higher assurance of personal identification than traditional authentication methods (e.g., passwords, ID card, challenge-response mechanisms). Large storage and processing requirements associated with the support of traditional biometrics can be a deterrent to systems with large numbers of entities, i.e. individuals, as compared to traditional authentication processing and storage requirements. Privacy laws which regulate the handling or prevent the distribution of PII can also be an impediment to incorporating biometrics in an existing system, as the biometric data from some of the potential users or targets of a security system may be resident in countries which have laws which do not allow transfer of the information across borders.

The biometric profiling system has two major subsystems. These are described below in conjunction with FIGS. 4-7. The first subsystem involves creating the biometric profiles that will be used to authenticate an individual, or that will be used to identify individuals matching one or more biometric profiles in the data set. Embodiments of this first subsystem include: the ability to acquire biometric data (e.g., from an existing biometrics repository) or enroll an individual (using traditional biometric enrollment devices); the ability to transform the biometric into a biometric profile; and the ability to incorporate or "ingest" the biometric profiles into the biometric profiling data set. The second subsystem includes matching an individual biometric profile against the biometric profile(s) in the system. Embodiments of this second subsystem include: the ability to enroll an individual's biometric(s) per the system's biometric profile modalities; the ability to transform the enrolled biometrics into biometric profiles; and the ability to match the individual's biometric profile(s) against those in the biometric profile repository.

Figure 4:
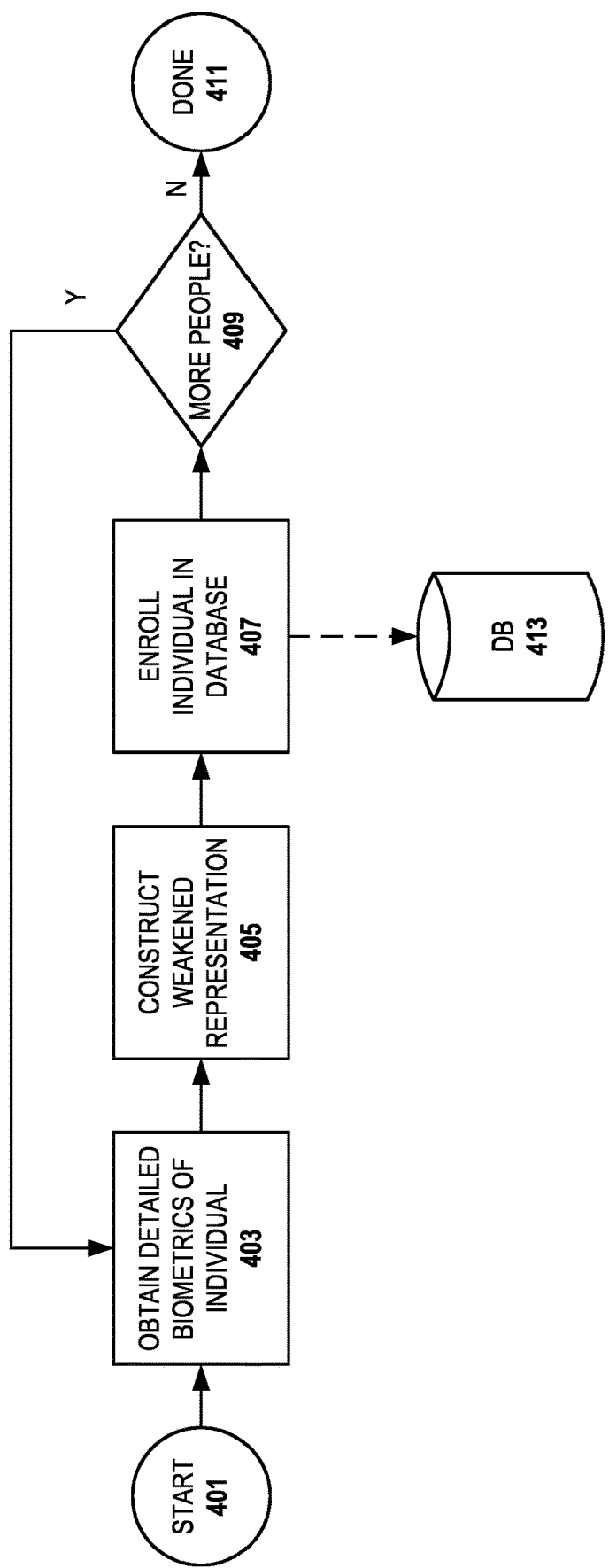
FIG. 4 is a flow diagram of an enrollment mechanism used in a preferred embodiment of the invention for a one-to-one authentication process.

With reference now to FIG. 4, a preferred embodiment of the invention is described where a one-to-one authentication is used. The process starts, 401, by obtaining the detailed biometrics of an individual, step 403. The detailed biometrics might be from a database or from a local or remote biometric scanner, e.g., a fingerprint or facial recognition scanner. The detailed biometrics could be the raw scan, but are more likely to be a detailed biometric profile in which the biometric features or data are summarized in a format used by the biometric scanner maker. The detailed biometrics are used to create a weakened biometric representation in step 405. Various methods which can be used in embodiments of the invention are discussed below. In some embodiments, there is a normalization step within the creation process wherein the format used by the biometric scanner maker is translated into a format used in the weakened biometric representation.

In step 407, the individual whose biometric data was used is enrolled in the data set in the database. Note that in embodiments of the invention, the data set is stored in file storage or other types of storage besides a traditional database. In preferred embodiments of the invention, only the weakened biometric representation is stored in the database 413. However, in alternative embodiments of the invention, both the detailed biometric data and the weakened representation are stored. Storing both the detailed biometric information and the biometric profile is useful in embodiments of the invention which correlate a plurality of weakened biometric profiles for a single individual where respective biometric profiles are created using different weakening mechanisms. However, storing both detailed and weakened data comes at a cost of speed and reduced storage costs enjoyed by preferred embodiments of the invention.

The process continues with step 409 which determines whether there are more people to be added to DB 413 which would be the case if the source of biometric data was a database of detailed biometric information, or if there are no people to be added, e.g., in the case where a single individual was being added to the DB 413 with a biometric peripheral. The process either returns to step 403 or ends step 411 as the result of the determination in step 409.

Respective embodiments of the invention use different processing techniques to reduce the biometric profile (data and storage) size, and therefore, reduce the processing required to perform biometric matching. For example, image processing techniques are used to reduce the size of facial recognition data and other image based data. Further, embodiments of the invention anonymize the detailed biometric information (e.g., fingerprints, picture ID's, signatures) originally captured by a biometric peripheral by reducing the amount of information in a biometric profile. As will be discussed in greater detail below, the invention reduces the amount of information in the weakened biometric representation so that it statistically would match with a subgroup of the population if that subgroup also was enrolled in a database of weakened biometric representations. Embodiments of the invention use biometric data that is captured or enrolled with an image by only storing portions (subsets or attributes) of the traditional (detailed) biometric template. The weakened biometric representation can be called a "profile", because the portion of the biometric that is saved will not be unique to only one individual, but it will also statistically match with other individuals having this saved subset of the biometric data (thus is alternatively called a biometric profile or a weakened biometric representation in the application).

Figure 5:
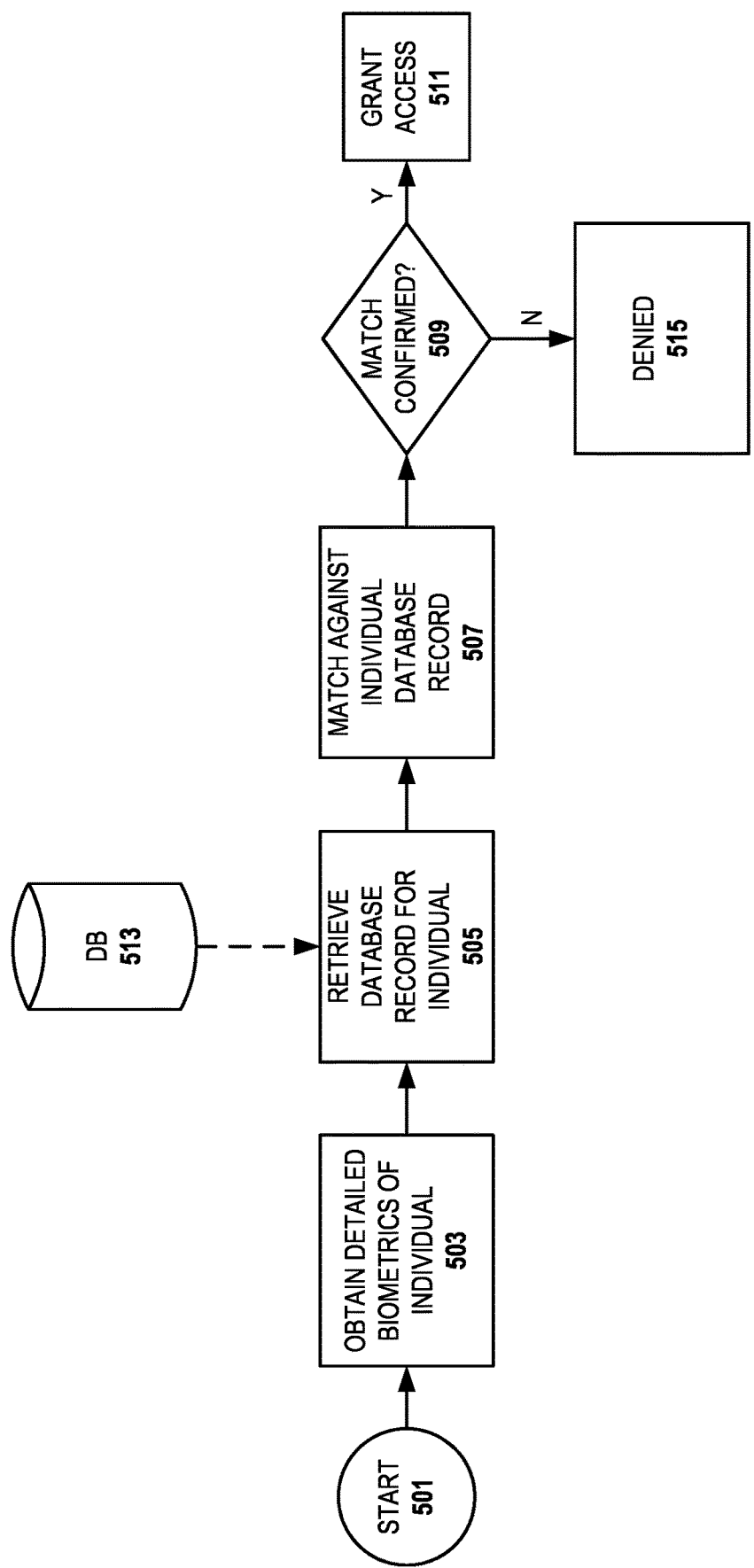
FIG. 5 is a flow diagram of matching a screening candidate to a database of weakened biometric profiles according to an embodiment of the invention for a one-to-one authentication process.

The process for using the weakened biometric representation in a one-to-one authentication process is described with reference to FIG. 5. The process starts (501) with an authentication process which requires biometric input, e.g., a fingerprint, of an individual who has previously enrolled in the system. The required detailed biometrics are obtained, for example, from a fingerprint scanner in step 503. The system then retrieves the weakened representation of the database 513 in step 505. Next, the detailed biometric data which has been just obtained in step 503 is compared the stored version of the weakened representation in the matching step 507. As only a subset of the information is present in the weakened representation, the matching will not be complete when comparing the detailed and the weakened forms of the biometric data. In some embodiments of the invention, the newly acquired detailed biometric data is weakened through the same technique as the representation stored in the database and then matched with the stored weakened representation. In another embodiment of the invention, the system will examine the detailed biometric data to determine if the limited number of biometric features found in the weakened representation are also found in the detailed data.

If the match is confirmed, step 509, the individual is allowed access, step 511. If not, the individual is denied access, step 515.

Other embodiments of the invention supplement authentication systems which use tradition types of authentication such as passwords and user IDs. In such an embodiment, step 507, would be augmented by a password check, or in other embodiments, the password check would be separate process which would precede, follow or proceed in parallel with the biometric matching. Examples of biometric authentication systems include corporate ID cards with pictures or fingerprints. Such ID cards are used in systems to authenticate individuals physically entering a building, or used in multi-factor authentication (e.g., in combination with passwords) to gain access to a computer or network, etc.

As discussed above, in connection with FIGS. 4 and 5, embodiments of the invention are used instead of or in addition to traditional "biometric authentication" systems (aka 1:1 matching systems). As discussed below in connection with FIGS. 6 and 7, embodiments of the invention can also be used in as well as "biometric identification" systems (aka 1:M matching systems). Embodiments of the invention are used in mobile devices and cloud computing platforms. Such embodiments will enable the use of biometrics in various identity management systems where previously not possible, due to storage and processing limitations of mobile devices. Example applications include de-centralized border crossing posts using mobile devices with the need to enforce watch-lists or wireless hand-held identity authentication or identification devices used by the military, border patrols, international posts and embassies, law enforcement, to restrict access to secured facilities.

Embodiments of the invention are somewhat simpler for 1:1 biometric profile authentication, than for 1:N:M biometric profile (flagging) identification. In most cases, 1:1 biometric profile matching requires less processing to match one individual to one biometric profile (i.e., 1:1 authentication), than the processing required to match that one individual's biometric against a total of M biometric profiles in a data set with M individual biometric entries. For 1:N:M biometric profile (flagging) identification, there are optimization techniques that can automatically reduce M to a smaller subset (N) that one would need to instead match against. One to one biometric profile matching is also simpler in that one can apply "passive" biometric enrollment (weaker) techniques. Weaker enrollment techniques by their nature align better with a biometric profile rather than a full biometric, since they are not always capable of capturing all of the necessary data for a full biometric enrollment.

Figure 6:
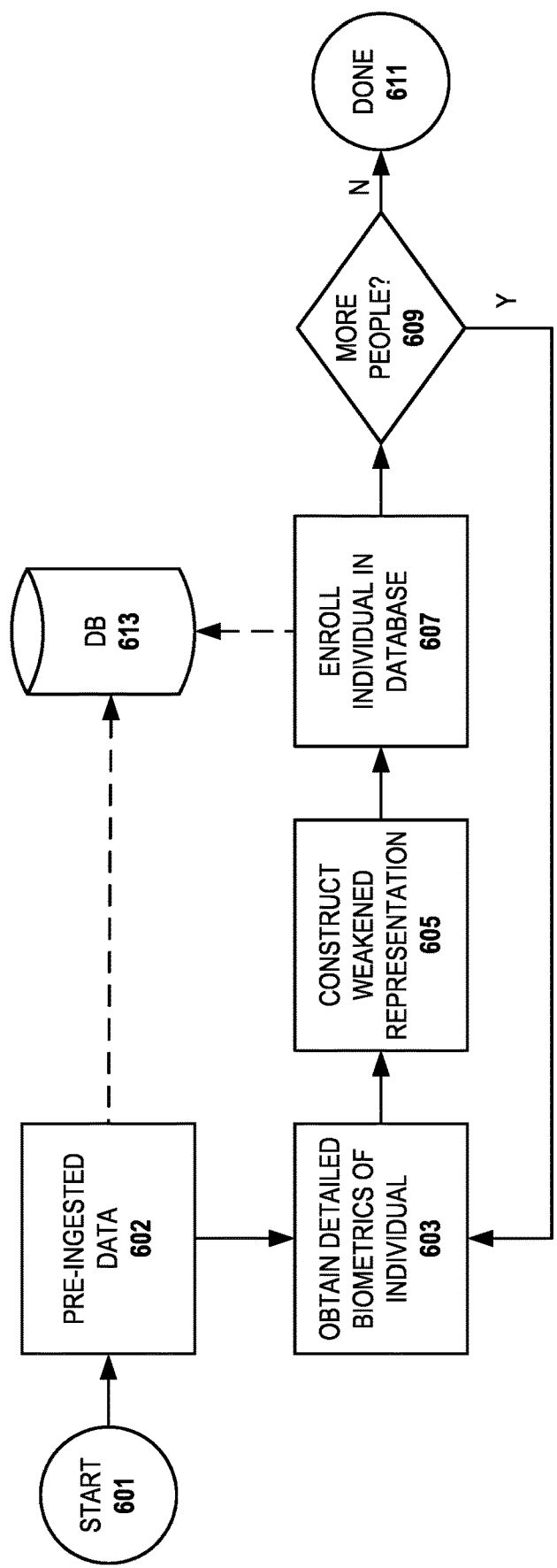
FIG. 6 is a flow diagram of another enrollment mechanism used in a preferred embodiment of the invention for a one-to-many matching process.

Referring now to FIG. 6, the process starts 601 with a collection of preingested data 602. The preingested biometric data may be sourced from one or more government databases where biometric data of suspects or targets exist and have been assembled in a single data store. The biometric data may be from a plurality of different biometric scanners, thus, the information may need to be normalized in following steps. The biometric data may be a larger collection of individuals than those which will be enrolled in the system database. In preferred embodiments of the invention, where the principles of the invention have gained acceptance, at least some of the preingested data will be in the form of weakened profiles.

Next, in step 603, the detailed biometrics of a target individual are obtained. A target individual is a selected individual to be enrolled in the system. The weakened representation of the individual's biometrics is constructed in step 605. In preferred embodiments, where the weakened representation or profile is obtained, steps 603 and 605 can be skipped, at least for that individual. Embodiments of the invention are adapted to a situation where the preingested data comes from multiple sources, and may be in different formats, and thus, there may be some differences in the process for creating the weakened profile depending on the source of the detailed biometric data. The target individual is then enrolled, step 607, in the database 613. The weakened profile is entered together with other personal information such as name, address and passport number. In this embodiment, the database 613 contains, for example, a list of individuals on a watchlist. A test is performed in step 609 to determine whether there are more people to be enrolled. If so, the process returns to obtain the detailed biometrics of the next individual in step 603. If all the target individuals have been enrolled, the process ends, step 611. Depending on the format of the biometric data one or more of these steps may be skipped for a particular individual.

Embodiments of the invention use multiple biometric profiles each of which have been compressed or created using different techniques or according to different criteria. By using multiple biometric profiles, or a "richer biometric profile", the invention improves the accuracy of watchlist matching, reduces the number of undesired false positives and false negatives that plague biometrics-based lists, while concurrently maintaining the anonymity of the target individuals and reducing storage and processing requirements as compared to traditional biometric-based security systems. The invention will decrease the false negatives when matching biometric profiles, because it will match more than one individual and will require less data & resolution. This is an improvement over the prior art since using a full biometric with low accuracy might allow the actual individual to pass by if their full biometric doesn't fully match the one on the watchlist. The invention will increase the false positives, but by design. By "weakening" the biometric, the invention increases the number of individuals that will match the given biometric profile. Since more people will match, the risk that the detailed information collected from an individual will not exactly match a full biometric is reduced. In embodiments of the invention where multiple biometric profiles are used, step 605 would create multiple profiles, each of which would be associated with the target individual and stored in the database. The biometric profiles constructed by different methods or from different types of biometrics can be stored in separate data stores or together in the same data store, e.g., classified by type.

Figure 7:
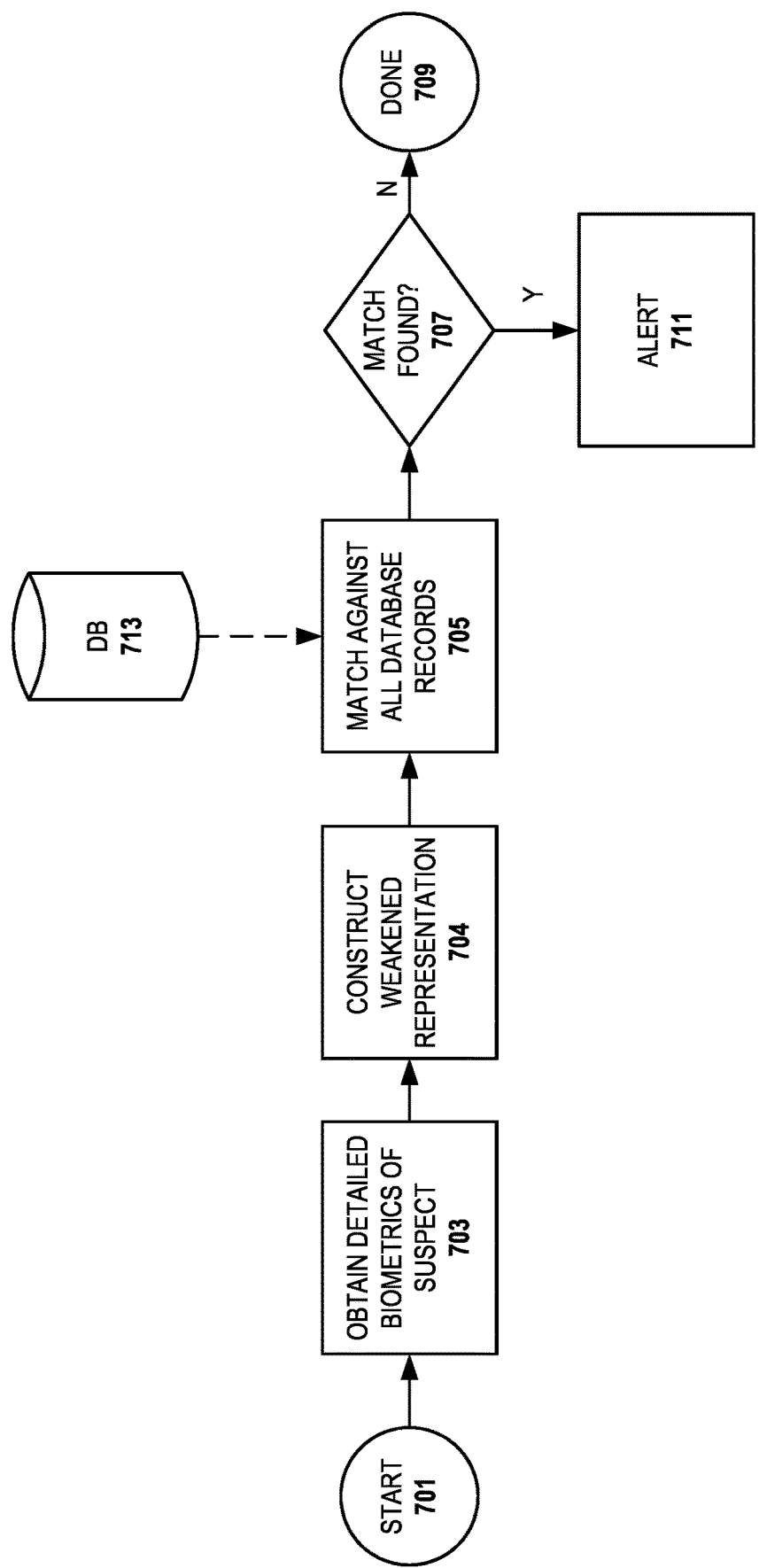
FIG. 7 is a flow diagram of matching a screen candidate to a data store of weakened biometric profiles in an embodiment of the invention for a one-to-many matching process.

FIG. 7 shows a process used in an embodiment of the invention, where a screening candidate is matched against the set of database records corresponding to a blacklist, for example in a border crossing situation, a so-called 1:M case. The process starts, 701, as the individual approaches the checkpoint and detailed biometrics of the screening candidate, aka suspect, are obtained, step 703. In step 704, optionally a weakened biometric representation is created. In step 705, the suspect's detailed biometrics are compared against the weakened biometric representations of members of one or more blacklists stored in database 713. If a match is not found, as would usually be the case, the process is complete and the screening candidate is allowed to pass, step 709. If a match is found, an alert is given, step 711, whereupon greater scrutiny is given to the screening candidate in terms of additional tests. Since the weakened representations are calculated to match several, but relatively few, individuals within the population, a match is not a dispositive identification that the screening candidate matches an individual on the blacklist. However, it is a strong indication that the screening candidate is of interest to those manning a border checkpoint or the like. If a weakened representation is calculated for the screening candidate, it can be used in the comparing step.

Preferred embodiments of the invention are used in government, corporate, and industry watch-lists as well as other biometric gating initiatives. For example, as watchlists are extended to include biometrics, the systems used must address privacy policies and legislation. Examples of such legislation included the Health Insurance Portability and Accountability Act of '96 (HIPAA), and international laws regarding transmitting/sharing personal information across country borders). As mentioned above, the devices used in a gating application may have system constraints (e.g., distributed systems with limited processing and storage) which prevent traditional biometric authentication. In preferred embodiments of the invention, the anonymized biometric profiles are used at the front end of a triage process to filter out the majority of individuals whose biometric profiles do not match those on the watchlist. Subsequent triage phases are then focused on a much smaller subset of individuals which match the biometric profiles. The subsequent triage phases, as they affect a much smaller group of individuals, although they are more time consuming per affected individual, can then effectively and efficiently apply more stringent biometric matching and other adjudication procedures. The overall process is more efficient and effective for the collective group of individuals.

The triage processes will deal with situations according to policies and metrics based on biographic and biometric matching. The biometric profile matching system described above indicates when an individual is matched with the biometric profile(s) of someone on the watchlist, hence, there is a possibility that the individual is the same individual matched on the watchlist. The triage process then continues. If the screening individual's biographic information (e.g., name, address, social security number, passport number, etc.) match those of the associated individual on the watchlist, the odds are good that the screening individual is an individual on the watchlist. If the individual's biographic information does not match or cannot be correlated, e.g., entity resolution or relationship resolution, to the associated data on the watchlist, then the triage process must define next steps (e.g., further questioning or identity authentication).

Embodiments of the invention use the following rules in a triage process. If an individual does not match the biographical or biometric profile data on a watchlist, the triage process allows the individual to proceed, i.e. past the checkpoint, customs, etc. If an individual matches either the biometric profile or the biographical data, the triage process should consider allowing the individual to proceed to the next triage stage while further investigation is done, e.g., a traditional biometric match request against the appropriate system(s). If both the biometric profile and biographic data match, the individual should be held up for further questioning and investigation.

Other example applications of embodiments of the invention include to biometric ID cards issued by the government (motor vehicles, ID cards, etc.), corporations (physical security, computer security, etc.) and finance industry (e.g., credit or debit cards). Embodiments of the invention use the individual's biometric instead of an ID card, e.g., healthcare programs for the homeless, emergency response systems providing localized aid and emerging countries or nomadic societies where biometrics is a much better solution than ID cards or biographical data.

Mobile and cloud computing platforms have been criticized for their lack of security and for the consequent risk of losing personal and private information. As is mentioned above, loss of personal data is particularly troublesome when the personal data is an individual's biometrics. The biometric profiles of the present invention can be used to increase security by authenticating users with biometrics (biometrics is stronger security than a password or token that can be lost or stolen), while limiting the risk of losing an individual's biometrics if the device is lost or stolen, or if the cloud storage is hacked. The biometric profile only contains a portion of an individual's actual biometric data. Therefore, the biometric profile is insufficient for a hacker to use to infiltrate another system requiring a full biometric, or another system using a different set of biometric profiles.

There are many attributes, subsets, or transformations that can be computed from a biometric. The biometric profile is a partial set of biometric-based data, which contains sufficient data to match an individual to the biometric profile— and the same data set will statistically match other individuals to the same biometric profile. The invention includes the recognition that biometric attributes, subsets or transformations used in a biometric profile can be calibrated to increase or decrease the fidelity of the matching, depending on the desired (or required) quality of the profile, i.e., the percentage of possible false positive and false negative matches. The following section describes several of many approaches to derive a subset of the data for a biometric profile, e.g., a subset of one traditionally extracts from a fingerprint.

In one preferred embodiment of the invention, biometric images are reduced to a subset by deriving a number of geometric figures (e.g., triangles) from biometric images. These figures are used as input to create a biometric profile (subset) that can be used to anonymously enroll, transmit, authenticate or match individuals. The number of geometric figures and other metadata collected can be calibrated to affect the precision of matches, as well as the storage and other constraints of the systems involved. The reduced size of the biometric profile dramatically decreases the time and processing required to authenticate or match biometrics against very large biometric data sets. In addition to the processing advantages, biometric profiles address anonymity and storage requirements. When constructing the biometric profiles, tradeoffs can be made to address the processing, storage and anonymity requirements as well as balancing those requirements against fidelity requirements. In preferred embodiments of the invention, a triage process is used to address varying privacy, fidelity and system constraints. For example, the triage process can be more extensive for a biometric profile with lower fidelity.

Figure 8:
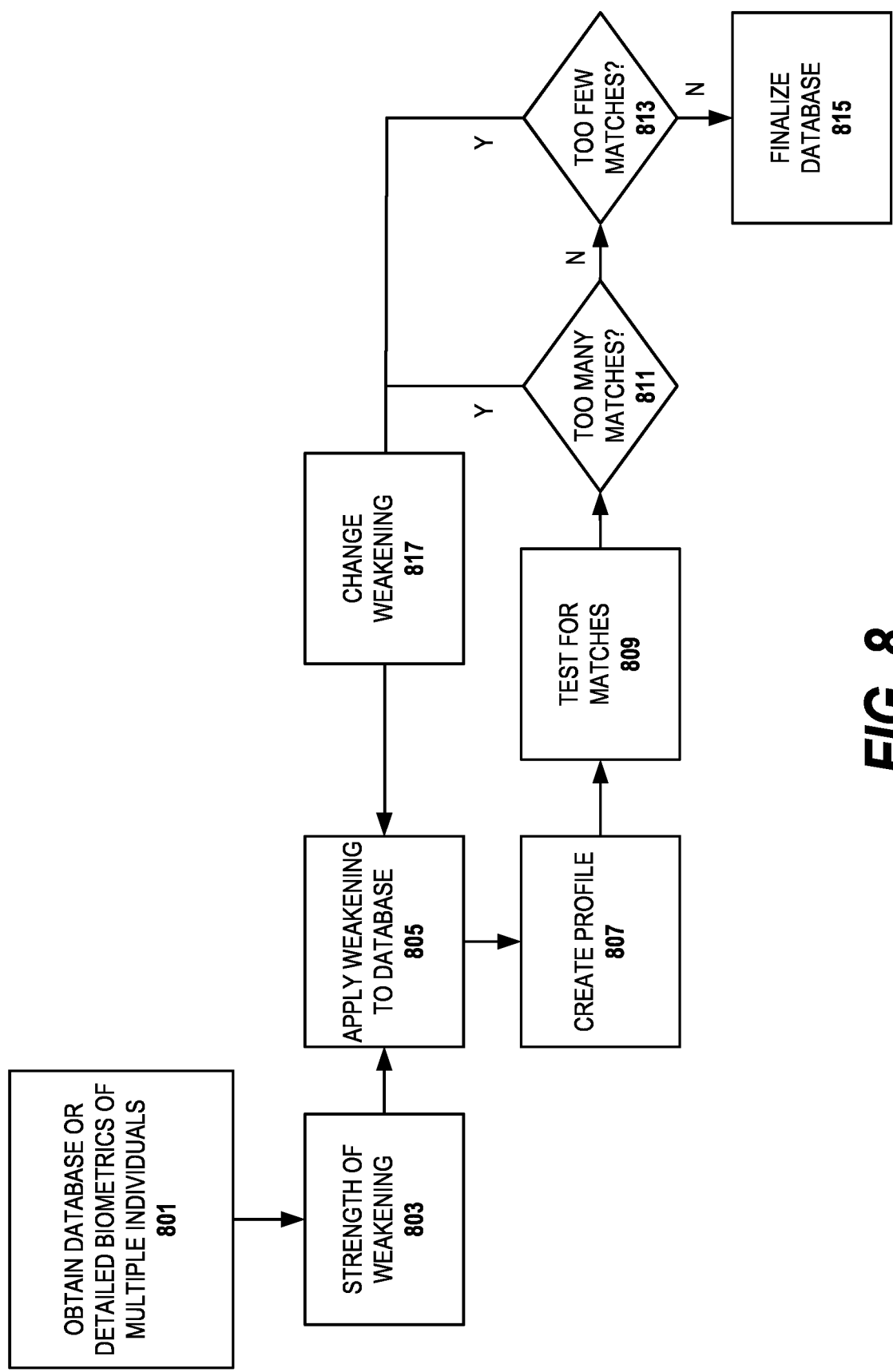
FIG. 8 is a flow diagram of calibrating the weakening mechanism in an embodiment of the invention.

FIG. 8 is a flow diagram of calibrating the weakening mechanism in an embodiment of the invention so that the weakening mechanism used has the proper tradeoffs for anonymization, reduced storage and processing requirements and fidelity or strength of matching, i.e. the likelihood that a match actually is the individual whose biometrics were retrieved from the database. The process begins in step 801 by obtaining detailed biometrics from a large group of individuals. Embodiments of the invention perform the calibration process for testing purposes, before using the biometric system in a real life application. If a test database is used, the identities of the individuals could be obfuscated in some way. In step 803, an initial estimate for the strength of the weakening mechanism is calculated, based on the tradeoffs for anonymization, reduced storage and processing requirements and fidelity. Based on the strength desired, the initial weakening mechanism is selected. The initial weakening mechanism is then applied to the detailed biometrics database, step 805. Individual biometric profiles are created, step 807, and stored in a test database.

Next, in step 809, a test for matches is performed to see if the proper amount of anonymization and fidelity have been achieved, that is, whether a desired number of matches have been created. One biometric profile is selected from the test database and matched against others to determine how many other profiles create matches, that is, whether a desired number or an undesired number of matches are produced. If there are too many, step 811, or too few, step 813, matches as compared to the calculated or desired number of matches the weakening mechanism is adjusted. If there are the proper number of matches, the weakening mechanism and/or the database is finalized, step 815. If the initially selected weakening mechanism did not yield the desired results, the weakening mechanism is adjusted in the correct direction in step 817 and the process repeated until the desired result is attained.

Embodiments of the invention use commonly employed measures of biometric system performance such as the Cumulative Match Curve or the Receiver Operating Characteristic curve to evaluate the degree of weakening for a given candidate mechanism. The Cumulative Match Curve (CMC) is used as a measure of 1:M identification system performance. It judges the ranking capabilities of an identification system. The Receiver Operating Characteristic curve (ROC curve) of a verification system, on the other hand, expresses the quality of a 1:1 matcher. The ROC plots the False Accept Rate (FAR) of a 1:1 matcher versus the False Reject Rate (FRR) of the matcher and database of biometrics. The CMC is also related to the FAR and FRR of a matcher. With increasing weakening of the biometric data, the value of the FAR will increase, while that of the FRR will decrease. The CMC may be used to evaluate the weakening and make sure that a target individual is within the CMC envelope.

CMC(K) is the probability that the correct match will be found in the top K matches as ranked by score. CMC(1)=1.0 would be a perfect matcher where every person showed up as the best match every time. Note that the CMC depends both on the probe entries as well as the background gallery (people you are not interested) as well as the size of the gallery. Concretely, if all the target individuals (probes) are Asians, then comparing them against a gallery of largely Asian people will make the matching harder (lower CMC (K)) than matching them against a database of largely Caucasian people. The same thing holds if the target individuals are primarily male and the gallery is either largely male versus a mixed gender population. In addition, CMC (K) for a gallery of 1M people will generally be lower than for a gallery of 10K people, because there is a greater chance for a spurious match in a smaller sample size.

In embodiments of the invention, the system uses a weakened biometric with $0.0<vlo<CMC(K)<vhi<1.0$ for a given K. So say vlo=90% and vhi=95%. To achieve this desired weakening with a given probe set and gallery, a generate-and-test search is performed. For a given weakening setting, w, the probe entries and the gallery entries are weakened using the same weakening mechanism and weakening parameters. Then the system computes CMC(K)=v and checks it against vlo and vhi. If it is within the range, the system stops. If v>vhi the weakening is increased. If v<vlo the weakening is decreased (retain more strength). This is repeated to narrow down the range for the weakening until the desired conditions are met. The weakening is generally a monotonic function so an efficient binary search can be performed. That is, if w0 yields v0<vlo and a higher w1 yields v1>vhi, the choice for the next weakening, w2, should be between the old w0 and w1 values.

As the nature of the weakening will vary according to the biometric technology used as well as the method of weakening, the general method of generating a test weakening and and determining the error (if any) is described in association with FIG. 8. As more history with a particular type of biometric data and a particular type of weakening is acquired, the initial estimate of parameters can be obtained from a plot of prior weakening attempts.

In embodiments of the invention, different organizations and systems use different biometric profiles for the same individual. The respective biometric profiles are created using different weakening methods or using, i.e., including, different biometric criteria.

One example of calibration that can be used in the invention is to adjust the number of triangles (or geometries) derived per biometric profile and the number of triangles (or geometries) needed to "match" the biometric profile Most fingerprints have a given number of minutiae points, which are positioned around specific ridges common across fingers. One can draw triangles connecting any 3 sets of minutiae, or polygons connecting any number of minutiae. These geometries then include angles and distance proportions that one can measure and then add a metadata for that fingerprint. The more of these geometric shapes and data points, the more unique the mapping of the data set will be to a biometric. Hence, if the average fingerprint has 10,000 possible geometries, but the system only keeps 500 geometries in a biometric profile, the odds are that these 500 geometries will match multiple individuals; whereas the entire set of 10,000 geometries might only have matched one individual. Embodiments of this invention can use this geometry reduction, and several other approaches that reduce or abstract traditional biometric data to weaken the matching.

Embodiments of the invention use different approaches to transforming the detailed biometrics into biometric profiles. Some embodiments will use multiple approaches to create multiple biometric profiles, each created in a different way, either to improve the fidelity of the match for the individual, or handle types of different biometric information. That is, some embodiments use biometric profiles for two types of biometric information, e.g., fingerprints and facial data. With two types of biometric profiles even when each one is relatively weak and sparse of data, the combination can strongly identify an individual. In embodiments of the invention where only the speed and reduced processing requirements are a goal. However, where anonymization of the individual's biometrics is also a goal, the biometric profiles in a system which uses multiple types of biometric profiles will need to be especially weak. The weakening approach may be selected based on the type of biometric scanner used to collect the information.

Some of the approaches used in embodiments of the invention to intentionally reduce the amount of information from detailed biometric signals include using fewer data types in the profile than available in the detailed biometric signal. For example, in using fingerprints to identify individuals, twelve minutiae points are traditionally used. In creating a biometric profile, only six or fewer minutiae points could be used, rather than the traditional twelve. Minutiae are major features of a fingerprint as ridge endings, ridge bifurcations, independent ridges, islands, ridge enclosures, spurs, crossovers, deltas and cores. Biometric profiles created by a first method could include ridges and spurs, while biometric profiles created by a second method could include spurs, crossovers and cores.

Another approach is to intentionally reduce the number of biometric features used in the biometric profile as compared to the detailed biometrics. For example, Eigen vectors or "Eigenfaces" are used to extract and classify features in facial recognition. A set of Eigenfaces can be generated by performing a mathematical process called principal component analysis (PCA) on a large set of images depicting different human faces. Eigenfaces use a set of "standardized face ingredients", derived from statistical analysis of many pictures of faces. Any human face can be considered to be a combination of these standard faces. PCA is technique which uses mathematical techniques to transform a number of possibly correlated variables into a smaller number of variables called "principal components". The "principal components" are the directions in the data which have the most variance.

Alternatively, the information can be reduced by quantization, i.e. only keeping the information in relatively coarse quanta, so the fine detail presented in the detailed biometric data will be rounded up or down to the nearest quantum value. Using the example of the Eigenfaces technique, the matches to the standard faces adjusted to a coarser percentage than used in the standard algorithm.

Embodiments of the invention construct the weakened biometric representation by passing a strong biometric representation computed from the input biometric signal through a lossy compressor and then decompressing the representation. The lossy compressor is a Principal Component Analysis compressor that selects principal components which account for X % of the variation in a collection of two or more strong biometric representations. In the example, X % is a desired amount of variation. In alternative embodiments, the lossy compressor is an artificial neural network with a hidden layer having X % of the neurons of the input layer and the neural network has been trained as an auto-encoder over a collection of two or more strong biometric representations.

Yet another approach is to intentionally increase or inject biometric noise into the detailed biometric data when creating the biometric profile. Embodiments of this approach will not achieve some of the invention's goals, e.g., reducing the size of the biometric profile for faster profile matching. Injecting noise would be useful in embodiments where only anonymization is required, e.g., due to government requirements, but not as useful in the embodiments with processor and/or storage constrained devices.

Removing fingerprint template data (e.g., some number of minutiae or other fingerprint characteristics such as cores, deltas, or pores) represents an example of weakening a fingerprint biometric, because studies show that the fewer the "fingerprint points," the larger the anticipated number of matches (i.e., reducing the uniqueness of the biometric). Hence, the more one removes fingerprint point data from a fingerprint template, the larger the set of matches one can expect in a database of fingerprints. The biometric profile weakening process entails discarding or separating the original biometric from the biometric profiles used for matching. The biometric profile can be further weakened by removing additional biometric data points to the template(s), however, a biometric profile may require data from the original biometric, or parametric transformation data used to weaken a template in order to "strengthen" the biometric profile. Once the desired amount of data is removed from the biometric template data to weaken a biometric profile, the resulting (persistent) data only represents a subset of the original biometric data (signals), it cannot be reversely derived or added to represent the biometric data of the individual without the original biometric or the parametric transformation data used to weaken the original template data.

Using any of the above techniques will "dilute" the biometric matching capabilities of standard biometric matching systems. In preferred embodiments of the invention, an important aspect of the invention is to ensure that the "dilution", the transformation to biometric profile, guarantees that the created biometric profile would generate a "match" with the target individual's detailed biometric information (and vice versa) in a subsequent authentication step, if performed. Note that there is not a requirement that the authentication of the target individual is necessarily performed in embodiments of the invention.

Since any of the techniques described above can vary in the reduction of "fidelity" by removing many or fewer bits of data, they provide a means of calibrating the biometric profiles to meet different needs and requirements. These requirements can be functional, how close a biometric match is required, how much anonymization is required, or performance oriented, what are the capabilities of the devices used for authentication. Thus, the calibration approach chosen should take into account the allowed or desired size of the match repository, the processing requirements and impacts on the authentication system, the number of anticipated matches based on the repository size, the number of target individuals to profile and other factors.

The reduction of de-facto biometric data (biometric profiles) increases the individual's privacy because their unique biometric is not stored in the watchlist—only a portion of their biometric(s) and biometric metadata is stored. Hence, the profile of an individual on a watchlist will statistically match numerous individuals—as well as that individual. The value of the biometric profile is that it will statistically match a very small portion of the population, limiting the impact on individuals not on the watchlist. By purposely increasing the number of false positives when creating profiles matching multiple individuals, the invention decreases the number of false negatives avoiding failure to match a biometric due to anomalies in the enrollment or template, etc. That is, the odds are better to match a profile biometric than to match a full biometric so as to avoid missing the desired match or identification.

A system that uses a "biometric profile" to either authenticate an individual (e.g., as part of a personal, financial, government or corporate ID), or identify an individual (e.g., from a watchlist, or a list of desired/undesired individuals). A biometric profile differs from a detailed biometric in that the biometric profile is not unique to the individual (i.e., it will statistically match multiple individuals), whereas the detailed biometric is unique to an individual. The system provides the ability to select which types of biometric profiles will be used for matching, as well as the ability to calibrate the "strength" or fidelity of the matching, thereby adjusting the probability of matching a larger or smaller set of individuals in the population.

This calibration can also be used to reduce the cost of storage and processing associated with the system(s), and enable mobile devices to apply various levels of biometric-strength matching where platform limitations previously hindered these capabilities, e.g., processor and storage limited mobile devices.

There are many applications for biometric profiling systems implemented according to the teaching of the present invention. Government furnished ID cards, (e.g., driver's license, passport, travel documents, Federal Common Access Card) benefit from biometric-strength matching, but are unable to use biometrics due to societal reluctance to biometrics, legal barriers, or the risk of losing an individual's biometric(s). Similarly, corporate furnished ID cards (e.g., employee id card, priority customer card) or financial institutions furnished cards, (e.g., credit cards, money cards, ATM cards) also benefit from biometric-strength matching, and face the same problems. Mobile device authentication (e.g., part of a multi-factor authentication to access the mobile device, or send the mobile device's authentication credentials to external multi-factor authentication systems) or other devices such as automobiles, vending machines, ATMs, home appliances which have limited computing capacity would benefit from the processing, speed and storage advantages of the present invention. Other embodiments of the invention include government border (land, air & sea) watchlist identification, International watchlist identification or inter-government travel documents (e.g., passports, visas).

Figure 9:
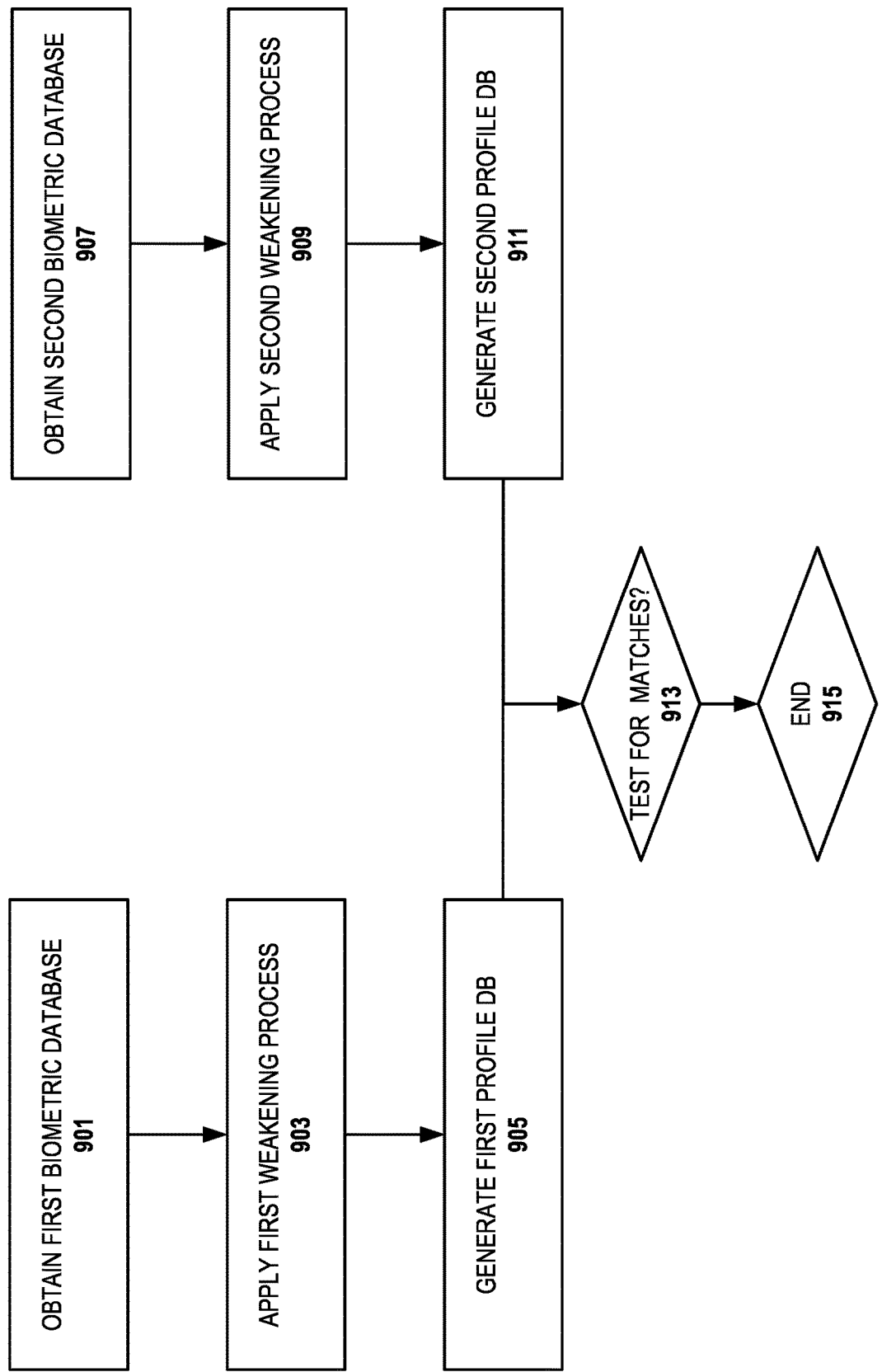
FIG. 9 is a flow diagram of matching biometric profiles created with different weakening mechanisms.

FIG. 9 shows an embodiment of the invention where two different weakening mechanisms are used for different populations of biometric data and the system tests to determine whether the resultant profiles are compatible, i.e. can be used in the same authentication or watchlist mechanism. In some cases, this will be due the fact that two vendors use different implementations of a weakening mechanism. In other embodiments, different jurisdiction may have different laws concerning the amount of their residents' PII that can be exported.

In step 901, a first database of biometric signatures is obtained. The detailed biometric signatures are weakened according to a first weakening process used by the first vendor or first jurisdiction, step 903. This results in the first set of biometric profiles, step 905. In step 907, a second database of detailed biometric signatures is obtained. In alternative embodiments of the invention, the first database can be used. The second weakening process is applied to these signatures, step 909, to result in a second set of biometric profiles. Next, a set of tests is performed to determine whether each set of biometric profiles can be used in the authentication or watchlist process. In one test, the detailed biometric data from one of the databases is used to test the system for matches against the weakened biometric profiles from each set of data. Though the drawing shows the contemporaneous generation and matching of two biometric watchlists, the embodiment has application to matching watchlists which have been created sometime, e.g., weeks or years, before the actually matching. This might be the case where the watchlists were from different countries or government agencies using biometric profiles. In the embodiment, N:M matching occurs, i.e. matching all of the biometrics in set N to those in set M.

FIG. 10 illustrates a national watchlist that has been extended with biometric profiles. There are many ways to represent the various types of biometric profile types, as well as the biometric profile metadata. One skilled in the art would understand that the profiles could contain more data, some of which would be useful in a subsequent triage process, e.g., gender, height, weight, hair color, eye color, etc. Further, in embodiments of the invention in which multi-factor authentication is used the biometric profile data column is expanded to include the additional factor, e.g., password. Embodiments which use two types of biometric profile, either because of two weakening mechanisms or two different types of biometric data, will have both types of biometric profile metadata. The watchlist could be further expanded to indicate sources for the biometric data. Preferably, the watchlist data is secured by a computer security mechanism such as encryption and handled appropriately given the privacy laws of the given jurisdiction.

Embodiments of the present invention provide methods for screening at least one individual against a watchlist database. Generally, the process includes obtaining a detailed input biometric signal associated with a screening candidate and constructing a weakened biometric representation of the detailed biometric signal such that there are expected to be a plurality of K matches in a database of size N. The target individual, e.g., suspect, is enrolled in the watchlist database using the weakened biometric representation to create a record. During the screening process, a detailed input biometric signal is obtained from a screening candidate and the process determines whether a biometric representation computed from the detailed biometric signal of the screening candidate matches the record of the enrolled suspect. The present invention can also further provide matching a strong biometric representation computed from the detailed biometric signal of the screening candidate against a strong biometric representation computed from the detailed biometric signal of the suspect when a match, using the weakened biometric profiles, has been determined to exist.

The present invention has many advantages over the prior art. There are limited solutions to the anonymization and size reduction of biometrics. Encryption is a traditional approach to addressing security and privacy requirements. There are numerous size reduction approaches, e.g., data compression algorithms which are used by the various biometrics tools that can be used in the present invention as well. With respect to anonymization, the drawback with the encryption approach is that one must eventually decrypt the individual's biometric (or biometric template) in order to match it against one or more biometrics at which point anonymity is lost. While other prior art methods seek to preserve anonymity, they also preserve a 1:1 (one to one) transformation relationship rather than a M:1 (many to one) transformation relationship with the approach of the present invention. In the invention, given a large data set of individuals, the same biometric profile will statistically apply to a number of different individuals; hence, there is no 1:1 correlation back to the individual and privacy is preserved. The size reduction offered by this approach, only capturing a small subset of the actual biometric image or template information, offers speed and storage benefits as well. Because the invention can calibrate the weakening mechanism used to create the profile, tradeoffs between anonymity, speed and storage consideration and fidelity of matching can all be accommodated.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method for using an anonymized biometric representation of a target individual in a computer based security system, comprising:
   obtaining a detailed input biometric signal associated with a target individual;
   constructing a weakened biometric representation of the detailed biometric signal such that the weakened biometric representation is designed to identify a plurality of individuals including the target individual by passing a strong biometric representation computed from the input biometric signal through a lossy compressor and then decompressing the representation; and
   enrolling the target individual in a data store associated with the computer based security system wherein the weakened biometric representation is included in a record for the target individual,
   wherein the constructing of a weakened biometric representation of the detailed biometric signal is designed such that the weakened biometric representation does not uniquely identify an individual but identifies a plurality of individuals with similar biometric characteristics in a database.

2. The method as recited in claim 1, further comprising:
   obtaining a detailed input biometric signal from a screening candidate individual; and
   determining whether the detailed biometric signal of the screening candidate matches the weakened biometric representation included in the record for the target individual.

3. The method as recited in claim 1 further comprising normalizing a detailed input biometric signal format from a biometric scanning device.

4. The method as recited in claim 1 further comprising an iterative procedure for calibrating the weakening mechanism for identifying at least a desired number of people in the database.

5. The method as recited in claim 1 wherein the target individual is a suspect and the data store is a watchlist data store comprising records of a plurality of suspects.

6. The method as recited in claim 1 where the lossy compressor is a Principal Component Analysis compressor.

7. The method as recited in claim 2 further compromising:
   including a non-biometric credential in the record; and
   determining whether a non-biometric credential of the screening candidate individual matches the non-biometric credential in the record.

8. Apparatus, comprising:
   a processor;

computer memory holding computer program instructions executed by the processor for performing database maintenance, the computer program instructions comprising:

program code, operative to obtain a detailed input biometric signal associated with a target individual;

program code, operative to construct a weakened biometric representation of the detailed biometric signal such that the weakened biometric representation is designed to identify a plurality of individuals including the target individual by passing a strong biometric representation computed from the input biometric signal through a lossy compressor and then decompressing the representation; and program code, operative to enroll the target individual in a data store associated with the computer based security system wherein the weakened biometric representation is included in a record for the target individual, wherein the constructing of a weakened biometric representation of the detailed biometric signal is designed such that the weakened biometric representation does not uniquely identify an individual but identifies a plurality of individuals with similar biometric characteristics in a database.

9. The apparatus as recited in claim 8, further comprising:
program code operative to obtain a detailed input biometric signal from a screening candidate individual; and
program code operative to determine whether the detailed biometric signal of the screening candidate matches the weakened biometric representation included in the record for the target individual.

10. The apparatus as recited in claim 8, further comprising:

program code, operative to construct a weakened biometric representation from the detailed biometric signal of the screening candidate; and wherein the weakened biometric representation from the detailed biometric signal of the screening candidate is matched to the weakened biometric representation included in the record for the target individual.

11. The apparatus as recited in claim 8, further comprising program code, operative to calibrate the weakening mechanism through an iterative procedure.

12. The apparatus as recited in claim 8, wherein the lossy compressor is an artificial neural network with a hidden layer and the neural network has been trained as an auto-encoder over a collection of two or more strong biometric representations.

13. The apparatus as recited in claim 10, further comprising program code operative to match a strong biometric representation computed from the detailed biometric signal of the screening candidate against a strong biometric representation computed from the detailed biometric signal of the suspect when a match has been determined to exist.

14. A computer program product in a non-transitory computer readable medium for use in a data processing system, the computer program product holding computer program instructions executed by the data processing system for performing database maintenance, the computer program instructions comprising:

program code, operative to obtain a detailed input biometric signal associated with a target individual;

program code, operative to construct a weakened biometric representation of the detailed biometric signal such that the weakened biometric representation is designed to identify a plurality of individuals including the target individual by passing a strong biometric representation computed from the input biometric signal through a lossy compressor and then decompressing the representation; and program code, operative to enroll the target individual in a data store associated with the computer based security system wherein the weakened biometric representation is included in a record for the target individual, wherein the constructing of a weakened biometric representation of the detailed biometric signal is designed such that the weakened biometric representation does not uniquely identify an individual but identifies a plurality of individuals with similar biometric characteristics in a database.

15. The computer program product as recited in claim 14, further comprising:

program code operative to obtain a detailed input biometric signal from a screening candidate individual; and program code operative to determine whether the detailed biometric signal of the screening candidate matches the weakened biometric representation included in the record for the target individual.

16. The computer program product as recited in claim 14, further comprising program code, operative to normalize a detailed input biometric signal format from a biometric scanning device.

17. The computer program product as recited in claim 14, further comprising program code, operative to use the weakened biometric representation in a multifactor authentication of the screening candidate, wherein at least one of the factors in the multifactor authentication is a non-biometric factor.

18. The computer program product as recited in claim 14, further comprising program code operative to normalize a detailed input biometric signal format from a biometric scanning device to a weakened biometric representation format.

19. The computer program product as recited in claim 14, further comprising:

program code, operative to apply an initial weakening mechanism to a plurality of detailed biometric signals constructing a respective weakened biometric representation of each of the plurality of detailed biometric signals, thereby constructing a plurality of weakened biometric representations;

matching respective ones of the plurality of weakened biometric representations to determine whether the initial weakening mechanism produces a desired number of matches within the plurality of weakened biometric representations; and responsive to a determination that an undesired number of matches was produced by the weakening mechanism, adjusting the initial weakening mechanism.

* * * * *